(12) United States Patent
Cis

(10) Patent No.: US 10,563,675 B2
(45) Date of Patent: Feb. 18, 2020

(54) SERVOVALVE

(71) Applicant: Hamilton Sundstrand Corporation, Charlotte, NC (US)

(72) Inventor: Marcin Cis, Lutynia (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 134 days.

(21) Appl. No.: 15/698,016

(22) Filed: Sep. 7, 2017

(65) Prior Publication Data

US 2018/0135661 A1    May 17, 2018

(30) Foreign Application Priority Data

Nov. 11, 2016  (EP) ................... 16461572

(51) Int. Cl.
*F15B 13/04* (2006.01)
*F15B 13/043* (2006.01)
(Continued)

(52) U.S. Cl.
CPC ...... *F15B 13/0402* (2013.01); *F15B 13/0436* (2013.01); *F15B 13/0444* (2013.01); *F15B 2211/327* (2013.01); *F15B 2211/40538* (2013.01); *F16K 11/0708* (2013.01); *F16K 11/0716* (2013.01); *Y10T 137/2322* (2015.04);
(Continued)

(58) Field of Classification Search
CPC .......... Y10T 137/8122; Y10T 137/794; Y10T 137/8049; Y10T 137/8085; Y10T 137/2322; Y10T 137/86622; Y10T 137/86702; Y10T 137/86614; F16K 11/0708; F16K 11/0716; F15B 9/07; F15B 13/0402; F15B 13/0436
See application file for complete search history.

(56) References Cited

U.S. PATENT DOCUMENTS 3,081,787 A    3/1963  Meulendyk
3,678,951 A *  7/1972  Coakley ................. F15O 3/12
                                                        137/14
(Continued)

FOREIGN PATENT DOCUMENTS

EP    1828622 B1    3/2009
EP    3023647 A1    5/2016
GB    2104249 A     3/1983

OTHER PUBLICATIONS

Extended European Search Report for International Application No. 16461572.6 filed Nov. 11, 2016, 6 pages.

*Primary Examiner* — Matthew W Jellett
(74) *Attorney, Agent, or Firm* — Cantor Colburn LLP

(57) ABSTRACT

A servovalve includes a fluid transfer valve assembly comprising a supply port and a control port a moveable valve spool arranged to regulate flow of fluid from the supply port to the control port in response to a control signal; and a jet pipe assembly configured to direct fluid to the ends of the spool to axially move the valve spool relative to the fluid transfer assembly in response to the control signal to regulate the fluid flow. The jet pipe assembly includes a jet pipe and a connector header fluidly connecting the jet pipe to a nozzle via which fluid is directed to the spool ends. One or more openings is provided in the spool such that fluid from the supply port flows into the interior of the spool and into the jet pipe and to the nozzle via the connector header.

13 Claims, 4 Drawing Sheets

(51) Int. Cl.
    *F15B 13/044*        (2006.01)
    *F16K 11/07*         (2006.01)
(52) U.S. Cl.
    CPC ............... *Y10T 137/86622* (2015.04); *Y10T
                                    137/86702* (2015.04)

(56)                References Cited

U.S. PATENT DOCUMENTS 4,046,061  A      9/1977   Stokes
    4,378,031  A  *   3/1983   Nicholson ........... F15B 13/0436
                                                         137/625.63
    4,560,969  A  *  12/1985   Nicholson ................ H01F 7/14
                                                         137/625.64
    4,783,047  A  *  11/1988   Baltus ................ F16K 31/0682
                                                         251/129.1
    4,997,002  A  *   3/1991   Blatter .................. F15B 13/043
                                                         137/625.62
    6,786,238  B2     9/2004   Frisch
    9,309,900  B2     4/2016   Kopp
    9,447,797  B2 *   9/2016   Sangiah ............. F15B 13/0436
    2013/0061959 A1*  3/2013   Stephens ................ F01L 1/344
                                                         137/544
    2015/0047729 A1   2/2015   Kopp et al.
    2018/0128393 A1*  5/2018   Wiktorko ................ F16K 11/07
    2018/0340555 A1* 11/2018   Cis ..................... F15B 13/0444

* cited by examiner

SERVOVALVE

FOREIGN PRIORITY

This application claims priority to European Patent Application No. 16461572.6 filed Nov. 11, 2016, the entire contents of which is incorporated herein by reference.

TECHNICAL FIELD

The present disclosure relates to servovalves used to transfer quantities of, or manage the flow of fluid e.g. air.

BACKGROUND

Servovalves find a wide range of applications for controlling air or other fluid flow to effect driving or control of another part e.g. an actuator.

A servovalve assembly includes a motor controlled by a control current which controls flow to a valve e.g. an air valve to control an actuator. Generally, a servovalve transforms an input control signal into movement of an actuator cylinder. The actuator controls e.g. an air valve. In other words, a servovalve acts as a controller, which commands the actuator, which changes the position of an air valve's (e.g. a so-called butterfly valve's) flow modulating feature.

Such mechanisms are used, for example, in various parts of aircraft where the management of air/fluid flow is required, such as in engine bleeding systems, anti-ice systems, air conditioning systems and cabin pressure systems. Servovalves are widely used to control the flow and pressure of pneumatic and hydraulic fluids to an actuator, and in applications where accurate position or flow rate control is required.

Conventionally, servovalve systems operate by obtaining pressurised fluid from a high pressure source which is transmitted through a load from which the fluid is output as a control fluid. Various types of servovalves are known—see e.g. GB 2104249, US 2015/0047729 and U.S. Pat. No. 9,309,900.

Electrohydraulic servovalves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve.

Particularly in aircraft applications, but also in other applications, servovalves are often required to operate at various pressures and temperatures. For e.g. fast acting air valve actuators, relatively large flows are required depending on the size of the actuator and the valve slew rate. For such high flow rates, however, large valve orifice areas are required. For 'flapper' type servovalves, problems arise when dealing with large flows due to the fact that flow force acts in the direction of the flapper movement and the motor is forced to overcome the flow forces. For clevis-like metering valves such as described in U.S. Pat. Nos. 4,046,061 and 6,786,238, the flow forces, proportional to the flow, act simultaneously in opposite directions so that the clevis is balanced and centered. The clevis, however, needs to be big due to the requirement for bigger orifices to handle larger flows.

Jet pipe servovalves provide an alternative to 'flapper'-type servovalves. Jet pipe servovalves are usually larger than flapper type servovalves but are less sensitive to contamination. In jet pipe systems, fluid is provided via a jet pipe to a nozzle which directs a stream of fluid at a receiver. When the nozzle is centered—i.e. no current from the motor causes it to turn, the receiver is hit by the stream of fluid from the nozzle at the centre so that the fluid is directed to both ends of the spool equally. If the motor causes the nozzle to turn, the stream of fluid from the nozzle impinges more on one side of the receiver and thus on one side of the spool more than the other causing the spool to shift. The spool shifts until the spring force of a feedback spring produces a torque equal to the motor torque. At this point, the nozzle is centred again, pressure is equal on both sides of the receiver and the spool is held in the centered position. A change in motor current moves the spool to a new position corresponding to the applied current.

As mentioned above, jet pipe servovalves are advantageous in that they are less sensitive to contamination e.g. in the supply fluid or from the valve environment. These valves are, however, more complex and bulkier. Additional joints are required for the fluid supply pipe and the supply pipe from the fluid supply to the jet pipe is mounted outside of the servovalve body in the torque motor chamber. In the event of damage to the pipe, this can result in external leakage. The pipe, being external, adds to the overall size and is more vulnerable to damage.

There is a need for a servovalve arrangement that can handle large fluid flows effectively, whilst retaining a compact design and being less vulnerable to contamination, damage and leakage.

The present disclosure provides a servovalve comprising: a fluid transfer valve assembly comprising a supply port and a control port; a moveable valve spool arranged to regulate flow of fluid from the supply port to the control port in response to a control signal; and a jet pipe assembly configured to axially move the valve spool relative to the fluid transfer assembly in response to the control signal to regulate the fluid flow; wherein the jet pipe assembly comprises a steerable nozzle from which fluid is directed to the ends of the spool in an amount determined by the control signal; and wherein fluid is provided to the nozzle via a connector header in fluid communication with the interior of the spool, the spool being provided with one or more openings via which fluid from the supply port enters the interior of the spool and flows into the connector header and to the nozzle.

The fluid transfer valve assembly may also comprise a return port for pressure returning through the assembly.

The servovalve preferably includes drive means for steering the nozzle in response to the control signal. The drive means may include a motor such as a torque motor arranged to steer the nozzle by means of an induced current. Other drive means may be used to vary the position of the nozzle. The drive means may be mounted in a housing attached to the valve assembly.

The nozzle is preferably provided at an end of a jet pipe closest to the valve assembly and fluid from the nozzle is directed into the valve assembly via a receiver. The receiver is preferably configured such that when the nozzle is in a central position, fluid enters the valve assembly evenly via both sides of the receiver, e.g. by opposing lateral receiver channels. When the nozzle is steered to an off-centre position, more fluid flows to one side of the valve assembly than the other via the receiver; e.g. more flows through one lateral receiver channel than the other.

The nozzle is preferably provided on a jet pipe mounted within a flexible tube, wherein the tube imparts movement to the jet pipe to steer the nozzle in response to the control signal e.g. using drive means as mentioned above. The jet pipe may comprise a nozzle portion and a main body portion; the main body portion may be in the form of a tube or a rod or wire.

The connector header may be formed integrally with the nozzle or nozzle portion or may be formed as a separated component and attached to the nozzle/nozzle portion e.g. by brazing or welding.

The connector header comprises an inlet to receive supply fluid and an outlet in fluid communication with the nozzle. The connector header is preferably secured in position relative to the valve assembly e.g. by clamps or screws.

Preferred embodiments will now be described with reference to the drawings.

DETAILED DESCRIPTION

A servovalve as described below can, for example, be used in an actuator control system. The servovalve is controlled by a torque motor to control a control flow of fluid that is output via e.g. a butterfly value to control the movement of an actuator.

Figure 1:
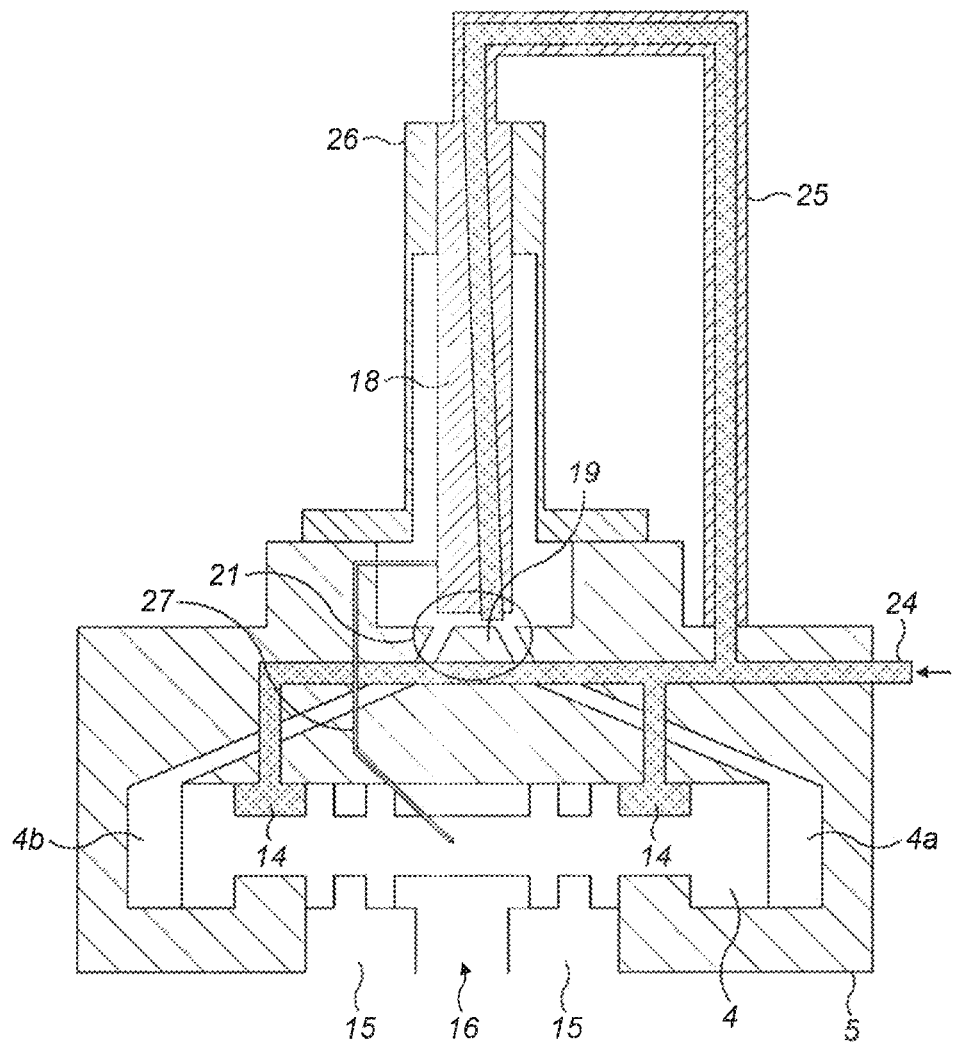
FIG. 1 is a schematic view of a conventional jet pipe servovalve.
Figure 2:
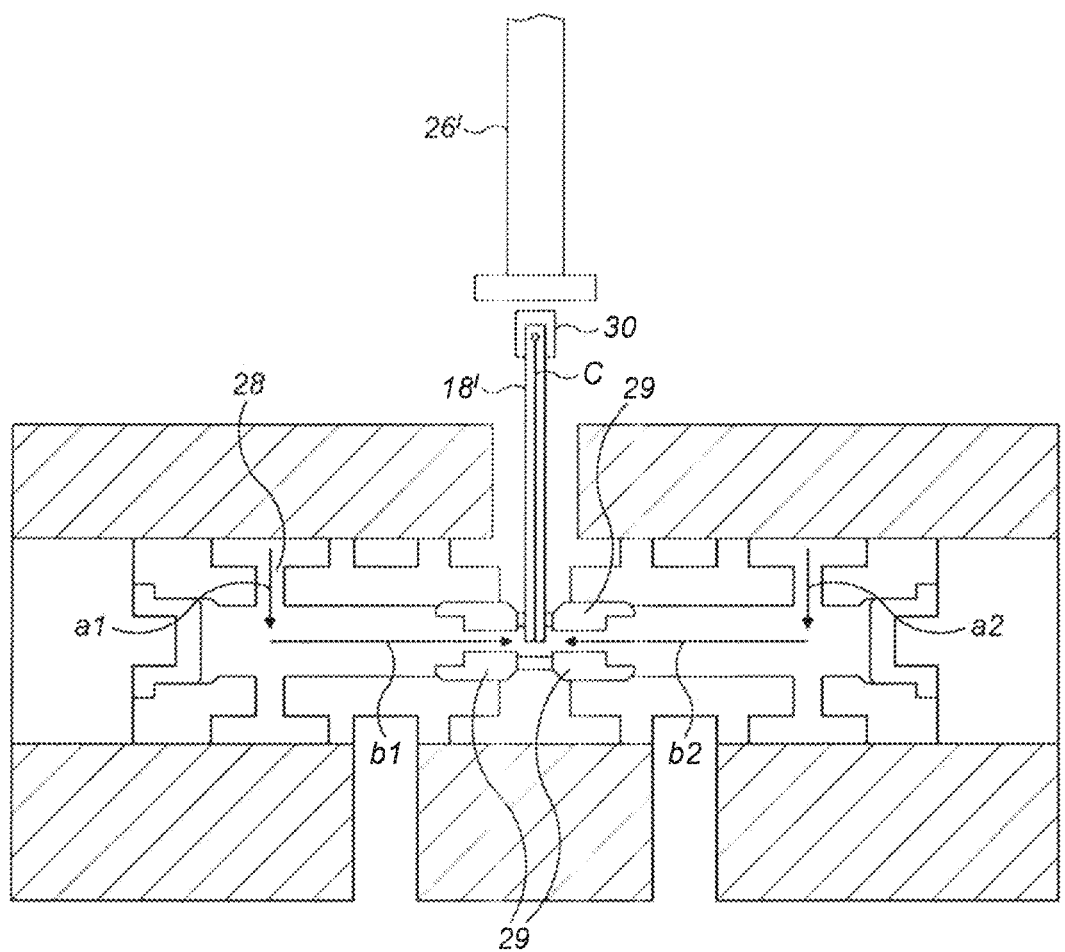
FIG. 2 is a cut-away view of a servovalve according to the disclosure.
Figure 3:
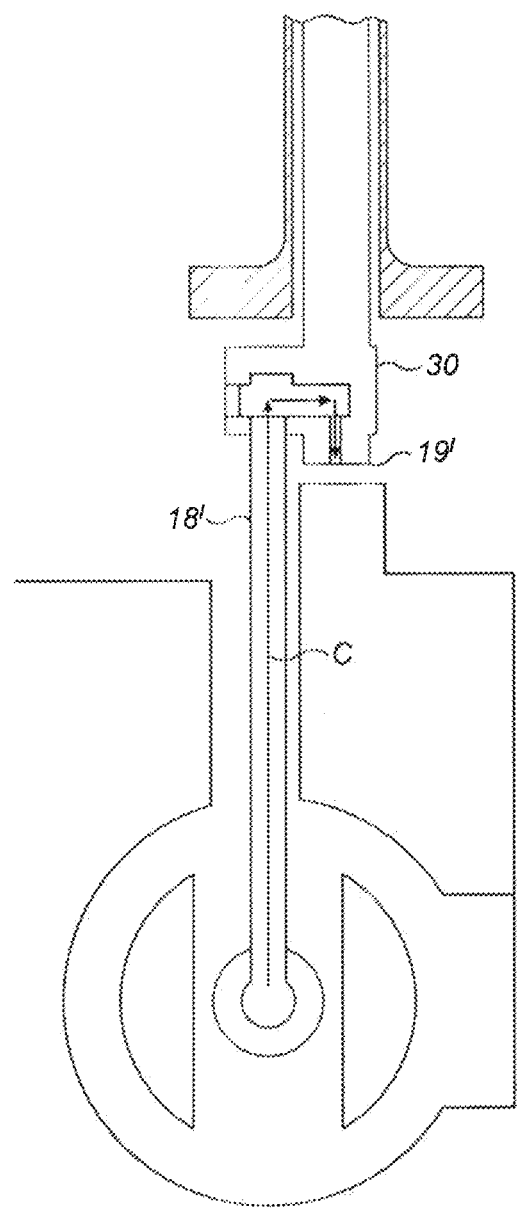
FIG. 3 is a detail of the servovalve of FIG. 2.
Figure 4:
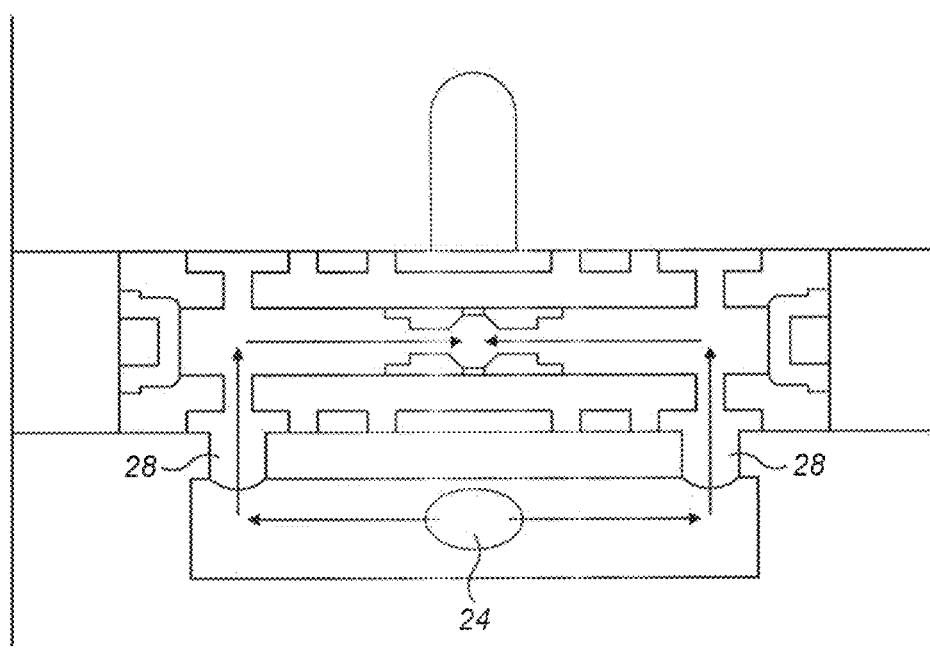
FIG. 4 is a detail of the servovalve of FIG. 2 showing flow from the supply port.
Figure 5:
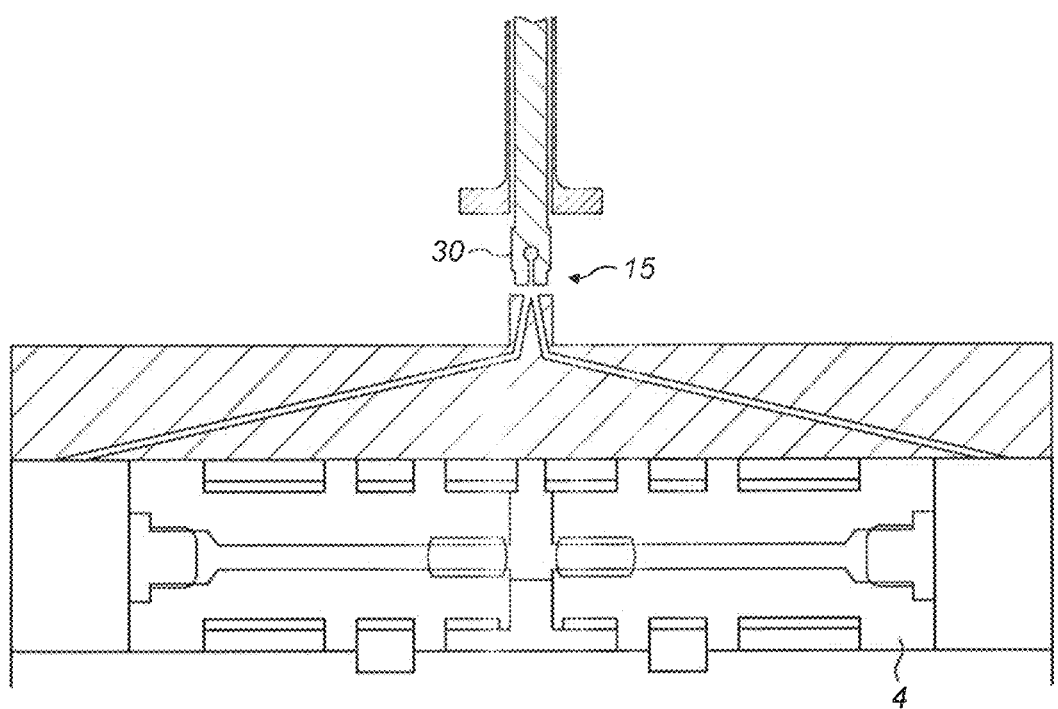
FIG. 5 is a schematic view of the servovalve of FIG. 2 showing the receiver.

With reference to FIG. 1 a conventional jet pipe servovalve will first be described. The arrangement comprises a servovalve assembly have a torque motor (not shown) and a moveable spool 4 mounted in a supporting block 5, or mounted in a cylinder mounted in a block (not shown). The spool 4 is part of a spool assembly having: supply ports 14, control ports 15, and a return port 16. Flow is possible between the ports via a passage through the spool 4. The torque motor provides current that causes a jet pipe 18 to turn at its end closest to the spool, which end terminates in a nozzle 19. Supply fluid is provided from the supply port, via a supply pipe 25 to the top of the jet pipe—i.e. the end opposite the end with the nozzle 19, and the supply fluid flows through the jet pipe and out of the nozzle 19. A receiver 21 is provided in the block below the nozzle. The receiver provides two channels 21a, 21b via which fluid from the nozzle 19 flows into the spool 4. When no current is applied by the motor to the jet pipe, the nozzle 19 is centered relative to the receiver 21 and supply fluid exiting the nozzle flows equally through both channels 21a, 21b and thus equally to both ends of the spool 4. The spool therefore remains centered—i.e. 'closed' so that no fluid flows through the control ports. When actuator control is desired, the motor provides a control current to the jet pipe causing the nozzle to turn away from the centered position. The supply fluid through the nozzle 19 then flows predominantly through one receiver channel 21a or 21b as compared to the other channel. More fluid flows, therefore, into the corresponding end of the spool 4 causing axial movement of the spool 4 with either blocks/occludes the passage between the supply port and the respective control port or opens the passage to allow flow between the two ports, depending on the axial position of the spool due to the position of the nozzle 19, thus modulating pressure on the control ports 15 and controlling the actuator (not shown).

In an example, the assembly is arranged to control an actuator based on the fluid flow from the control port 15 e.g. via a butterfly valve. The servovalve controls an actuator which, in turn, controls an air valve such as a butterfly valve.

Supply pressure is provided to the servovalve housing via supply port 24 and to the spool 4 via spool supply ports 14. The pressure at return port 16 is a return pressure which will vary depending e.g. on the altitude of the aircraft in flight. Control ports 15 provide a controlled pressure, dependant on the nozzle position and resulting spool position, to be provided to an actuator. A supply pipe 20 is also connected to the supply port 24 and routes supply fluid external to the spool and into the top end of the jet pipe 18. The supply fluid flows down the jet pipe 18 to the nozzle 19 and exits to the receiver 21 described above. The jet pipe 18 is preferably mounted in a flexural tube 26. While the nozzle 19 is centered as shown in FIG. 1, equal amounts of fluid go to the two ends 4a, 4b of the spool 4.

The spool 4 is in the form of a tubular member arranged in the block 5 to be moved axially by fluid from the jet pipe 18 via the nozzle 19 that is directed at the spool 4 via the receiver 21.

The feedback spring is indicated in FIG. 1 by a dashed line 27 and serves to return the nozzle to the centered position.

In more detail, in the embodiment shown, to open the servovalve, control current is provided to coils of the motor (here a torque motor) creating electromagnetic torque opposing the sum of mechanical and magnetic torque already 'present' in the torque motor 1. The bigger the electromagnetic force from the coils, the more the jet pipe nozzle turns. The more it turns, the greater the linear or axial movement of the spool 4. A torque motor usually consists of coil windings, a ferromagnetic armature, permanent magnets and a mechanical spring (here two torsional bridge shafts). This arrangement provides movement of the nozzle 19 proportional to the input control current. Other types of motor could be envisaged.

The servovalve assembly of the present disclosure, described with reference to FIGS. 2 to 5, avoids the need for the supply pipe 25, thus avoiding many of the disadvantages of conventional jet pipe servovalves. Instead of providing supply fluid to the jet pipe externally, in the present disclosure the supply fluid is provided to the jet pipe from inside the servovalve assembly, using the flow of supply fluid provided to the spool supply ports 14. To do this, openings 28 are provided in the wall of the spool 4 to enable the supply fluid provided to the spool 4 via the supply port 24 to flow inside the spool body as shown by arrows a1, a2 of FIG. 2. The jet pipe 18' extends into the interior of the spool 4 and is preferably secured in position e.g. by clamps or screws 29. The supply fluid, which is conventionally supplied at a pressure of around 10 mPa, but may of course be other pressure values including much higher pressures e.g. 21 MPa, flows into the interior of the spool 4 towards the middle (arrows b1,b2) and is drawn up, under pressure, into the end of the jet pipe 18' extending into the spool (arrow c). This end is in fluid engagement with the nozzle 19' as can best be seen in FIG. 3. Arrows d1 and d2 show how the fluid flows from the jet pipe 18' into the nozzle 19' from which it exits as in conventional systems to the receiver 21 (shown schematically in FIG. 5).

FIG. 4 shows, again by arrows, how the fluid flows from the supply port 14 into the opening(s) 28 into spool 4 and then to the end of the jet pipe 18' extending into the spool.

With this arrangement, the jet pipe 18' can be in the form of a pipe extending into the spool with a connector header piece 30 defining a flow channel from the jet pipe to the nozzle 19'. The header piece 30 can be formed integrally with the pipe or could be formed as a separate piece and attached to the pipe by e.g. brazing or welding. As only the header piece needs to be under pressure, making it as a separate component can be advantageous in terms of manufacturing.

Something is required to steer the nozzle 19' in response to motor current to control the valve by moving the spool. In conventional systems, this is provided by the body of the jet pipe extending out of the spool, preferably within a flexural tube. In the system of the disclosure, it is not necessary to have the externally extending jet pipe and so this could be replaced by e.g. a simple wire (not shown) which may be mounted in a flexural tube 26') and which is moved by the motor current to turn the nozzle to provide the desired flow to respective ends of the spool via the receiver.

The jet pipe, supplied by the spool thus also functions as the feedback spring needed in the conventional system.

The system of this disclosure has fewer component parts than conventional systems; there is less risk of leakage into the motor chamber as the supply pressure remains within the assembly; fewer connections and joints are required and the assembly can be smaller.

Although this disclosure has been described in terms of preferred examples, it should be understood that these examples are illustrative only and modifications and alterations are possible within the scope of the claims.

The invention claimed is:

1. A servovalve comprising:
    a fluid transfer valve assembly comprising a supply port and a control port;
    a moveable valve spool arranged to regulate flow of fluid from the supply port to the control port in response to a control signal; and
    a jet pipe assembly configured to axially move the valve spool relative to the fluid transfer assembly in response to the control signal to regulate the fluid flow;
    wherein the jet pipe assembly comprises a steerable nozzle from which fluid is directed to the ends of the spool in an amount determined by the control signal; and
    wherein fluid is provided to the nozzle via a connector header provided on the jet pipe in fluid communication with the interior of the spool, the spool being provided with one or more openings via which fluid from the supply port enters the interior of the spool and flows into the jet pipe and connector header and to the nozzle; and
    wherein the jet pipe assembly extends into the interior of the spool and the connector header is secured in position relative to the valve assembly by clamps or screws.

2. The servovalve of claim 1, wherein the fluid transfer valve assembly further comprises a return port for pressure returning through the assembly.

3. The servovalve of claim 1, further comprising drive means for steering the nozzle in response to the control signal.

4. The servovalve of claim 3, wherein the drive means comprises a motor arranged to steer the nozzle by means of an induced current or wherein the drive means is a hydraulic power source arranged to steer the nozzle by hydraulic flow.

5. The servovalve of claim 1, wherein the nozzle is provided at an end of a jet pipe closest to the valve assembly and fluid from the nozzle is directed into the valve assembly via a receiver.

6. The servovalve of claim 1, wherein the receiver is configured such that when the nozzle is in a central position, fluid enters the valve assembly evenly via both sides of the receiver when the nozzle is steered to an off-centre position, more fluid flows to one side of the valve assembly than the other via the receiver.

7. The servovalve of claim 1, wherein the receiver comprises lateral receiver channels to provide flow to each side of the valve assembly.

8. The servovalve of claim 1, wherein the connector header is formed integrally with the nozzle or wherein the connector header is formed as a separated component and attached to the nozzle.

9. The servovalve of claim 1, wherein the connector header comprises an inlet to receive supply fluid and an outlet in fluid communication with the nozzle.

10. The servovalve of claim 9, wherein the connector header is attached to the nozzle by welding or brazing or adhesion.

11. The servovalve of claim 1, wherein the nozzle is provided on a jet pipe mounted within a flexible tube, wherein the tube imparts movement to the jet pipe to steer the nozzle in response to the control signal.

12. The servovalve of claim 11, wherein jet pipe comprises a nozzle portion and a main body portion.

13. The servovalve of claim 12, wherein the main body portion is in the form of a tube or wherein the main in body portion is in the form of a rod or wire.

* * * * *